United States Patent [19]
Hirano et al.

[11] Patent Number: 6,120,858
[45] Date of Patent: Sep. 19, 2000

[54] BLACK SEALANT FOR LIQUID CRYSTAL CELL AND LIQUID CRYSTAL CELL

[75] Inventors: Masahiro Hirano; Masaki Shinmoto, both of Saitama; Shigeru Matsuyama; Akira Ishii, both of Chiba, all of Japan

[73] Assignee: Nippon Kayaku Kabushiki Kaisha, Tokyo, Japan

[21] Appl. No.: 09/123,713

[22] Filed: Jul. 28, 1998

[30] Foreign Application Priority Data

Aug. 1, 1997 [JP] Japan ..................................... 9-219821

[51] Int. Cl.$^7$ ............................ B32B 17/10; C09K 19/00
[52] U.S. Cl. ........................... 428/1; 523/440; 523/442; 523/458; 523/459
[58] Field of Search ..................................... 523/440, 442, 523/458, 459; 428/1

[56] References Cited

U.S. PATENT DOCUMENTS 4,695,490  9/1987  McClelland et al. ....................... 428/1

FOREIGN PATENT DOCUMENTS

| 63-081117 | 4/1988 | Japan . |
| 2-296223 | 12/1990 | Japan . |
| 5-88189 | 4/1993 | Japan . |
| 7-31895 | 12/1995 | Japan . |

*Primary Examiner*—Robert Dawson
*Assistant Examiner*—D. Aylward
*Attorney, Agent, or Firm*—Nields, Lemack & Dingman

[57] ABSTRACT

Provided is a black sealant for liquid crystal cell comprising (a) an epoxy resin, (b) a novolac resin, (c) a curing accelerator and (d) a titanium-type black pigment. The use of the black sealant for liquid crystal cell of the present invention can provide a liquid crystal cell which prevents light leakage of the liquid crystal cell from the sealed portion, which has a high electrical insulation property and which is excellent in an adhesion strength and a humidity resistance.

14 Claims, No Drawings

BLACK SEALANT FOR LIQUID CRYSTAL CELL AND LIQUID CRYSTAL CELL

FIELD OF THE INVENTION

The present invention relates to a black sealant for liquid crystal cell and a liquid crystal cell obtained by using the same. More specifically, the present invention relates to a black sealant for liquid crystal cell which has a high light-shielding property for preventing light leakage of a liquid crystal cell and which is excellent in an insulation property, an adhesion strength and a humidity resistance, and a liquid crystal cell obtained by using the same.

PRIOR ART

A liquid crystal cell is usually produced by coating a sealant for liquid crystal cell on glass substrates using a dispenser or through screen printing, then leveling the same through heating or without heating, bonding the upper and lower glass substrates with a high precision using an alignment mark to press the sealant thereon. As the sealant for liquid crystal cell used herein, a thermosetting epoxy resin is mainly used. However, a sealant for liquid crystal cell in which an amine, an imidazole or a hydrazide is used as a curing agent of an epoxy resin is problematic in that an adhesion and a humidity resistance are poor. In order to solve this problem, Japanese Patent Publication No. 24,403/1984 shows that a sealant for liquid crystal cell in which a phenolic novolac resins are used as a curing agent of an epoxy resin has an excellent humidity resistance.

However, since this sealant for liquid crystal cell is transparent or semitransparent, light leakage occurs through this sealant for liquid crystal cell in the case of a liquid crystal display element of a type in which a light is applied from the back of a liquid crystal cell for display. When the light leaks, the contrast is decreased, and the displayed image is hardly seen. Further, when bright characters or patterns are displayed on a dark display surface and light leaks from a sealed portion, a frame portion of a liquid crystal display shines brightly. For this reason, a method was considered in which carbon black or a black dye was incorporated into a sealant for liquid crystal cell to give a light-shielding black color for preventing light leakage.

However, the sealant for liquid crystal cell in which carbon black was used had a defect that an insulation property was poor because carbon black was electrically conductive. Further, a sealant for liquid crystal cell in which a dye was used was poor in a light-shielding property and caused contamination of a liquid crystal material or corrosion of an ITO electrode of a liquid crystal cell because a dye had a high ion concentration as an impurity. Accordingly, a sealant for liquid crystal cell which is high in an insulation property, a humidity resistance and a light-shielding property has been in demand.

Still further, a recent liquid crystal cell is produced by a multi-process in which a large number of electrodes are formed on large glass substrates, and the upper and lower substrates are then assembled through bonding and then divided into individual liquid crystal cells. The glass substrate itself becomes increasingly large-sized such that it is changed from a one-cell substrate to a two-cell substrate, a four-cell substrate, a six-cell substrate and a nine-cell substrate. Furthermore, in recent years, a size of a liquid crystal cell itself is much increased, with the result that a stress to be exerted on a seal portion in the multi-process is by far higher than as usual. Moreover, in order to increase a display area and decrease a frame portion of a liquid crystal cell, a width of a seal line is being decreased. Therefore, a strength is exerted on a seal portion in cutting a glass substrate in the multi-process. There arises a problem that a sealed portion is peeled off with the strength at this time. A sealant having an excellent adhesion is required, but an ordinary sealant obtained by using an amine, an imidazole or a hydrazide as a curing agent has a poor adhesion, making it impossible to adapt to a large-sized glass substrate or liquid crystal cell. In addition, a length of a seal line is increased in a large-sized liquid crystal cell, and a contact portion of a sealant with an external environment becomes large. Accordingly, a sealant for liquid crystal cell having an excellent humidity resistance has been in demand.

SUMMARY OF THE INVENTION

In order to solve the above-mentioned problems, the present inventors have assiduously conducted investigations, and have consequently completed the present invention.

That is, the present invention relates to the following (1) to (14).

(1) A black sealant for liquid crystal cell comprising (a) an epoxy resin, (b) a novolac resin, (c) a curing accelerator and (d) a titanium-type black pigment.

(2) The black sealant for liquid crystal cell recited in the above-mentioned (1), wherein the particle diameter of the titanium-type black pigment (d) is 4 μm or less.

(3) The black sealant for liquid crystal cell recited in the above-mentioned (1) or (2), wherein the amount of the titanium-type black pigment is between 10 and 70% by weight based on the solid content except the organic solvent of the black sealant for liquid crystal cell.

(4) The black sealant for liquid crystal cell recited in any one of the above-mentioned (1) to (3), wherein the volume resistivity of the cured film of the black sealant for liquid crystal cell is $10^7 \Omega \cdot$ cm or more.

(5) The black sealant for liquid crystal cell recited in any one of the above-mentioned (1) to (4), wherein the optical density (OD) of the cured film of the black sealant for liquid crystal cell is 2.0 or more with the film thickness of 7 μm or less.

(6) The black sealant for liquid crystal cell recited in any one of the above-mentioned (1) to (5), which further comprises an organic pigment and/or an inorganic pigment.

(7) A black sealant for liquid crystal cell comprising (a) an epoxy resin, (b) a novolac resin, (c) a curing accelerator, (d) a titanium-type black pigment and (e) a spacer.

(8) The black sealant for liquid crystal cell recited in the above-mentioned (7), wherein the diameter of the spacer (e) is between 2 and 10 μm, and the particle diameter of the titanium-type black pigment (d) is less than the diameter of the spacer.

(9) The black sealant for liquid crystal cell recited in the above-mentioned (8), wherein the particle diameter of the titanium-type black pigment (d) is not more than half the diameter of the spacer.

(10) The black sealant for liquid crystal cell recited in the above-mentioned (8) or (9), wherein the amount of the titanium-type black pigment (d) is between 10 and 70% by weight based on the total amount of the epoxy resin (a), the novolac resin (b), the curing accelerator (c) and the titanium-type black pigment (d).

(11) The black sealant for liquid crystal cell recited in any one of the above-mentioned (8) to (10), wherein the amount of the spacer (e) is between 0.05 and 4 parts by weight per 100 parts by weight in total of the epoxy resin (a), the novolac resin (b), the curing accelerator (c) and the titanium-type black pigment (d).

(12) A liquid crystal cell which is sealed with the sealant recited in any one of the above-mentioned (1) to (11).

(13) A liquid crystal display element having the liquid crystal cell of the above-mentioned (12).

(14) A cured film comprising, as essential components, (a) an epoxy resin, (b) a novolac resin, (c) a curing accelerator and (d) a titanium-type black pigment, and having a volume resistivity of $10^7 \Omega \cdot$ cm or more.

DETAILED DESCRIPTION OF THE INVENTION

The sealant for liquid crystal cell of the present invention comprises (a) an epoxy resin, (b) a novolac resin, (c) a curing accelerator and (d) a titanium-type black pigment.

The epoxy resin (a) used in the present invention is not particularly limited. Examples thereof include epoxy resins which are generally produced and marketed, for example, epoxy resins such as bisphenol-type epoxy resins, N,N-diglycidyl-o-toluidine, N,N-diglycidylaniline, phenylglycidyl ether, resorcinol diglycidyl ether, 1,6-hexanediol diglycidyl ether, trimethylolpropane triglycidyl ether, polypropylene glycol diglycidyl ether, (3,4-epoxycyclohexylmethyl)-3,4-epoxycyclohexanecarboxylate and hexahydrophtharic anhydride diglycidyl ester; polyfunctional epoxy resins which are glycidyl ethers of polyphenol compound, for example, bisphenol S, 4,4'-biphenylphenol, 2,2',6,6'-tetramethyl-4,4'-biphenylphenol, 2,2-methylene-bis(4-methyl-6-tert-butylphenol), trishydroxyphenylmethane, pyrogallol and a phenol containing diisopropylidene skeletons, a phenol containing a fluorene skeleton such as 1,1-di-4-hydroxyphenylfluorene and a polybutadiene having hydroxyphenyl group (phenolic polybutadiene); diglycidyl ethers of a novolac resin, for example, a novolac resin obtained by using as starting materials phenols such as phenol, cresol, ethylphenol, butylphenol, octylphenol, bisphenol A, bisphenol F, bisphenol S and naphthol, a xylylene skeleton-containing phenolic novolac resin, a dicyclopentadiene skeleton-containing phenolic novolac resin and a fluorene skeleton-containing phenolic novolac resin; alicyclic epoxy resins containing an aliphatic skeleton such as cyclohexane; heterocyclic epoxy resins having heterocyclic rings, for example, an isocyanuric ring and a hydantoin ring; and epoxy resins obtained by glycidylating brominated phenols, for example, brominated bisphenol A, brominated bisphenol F, brominated bisphenol S, brominated phenolic novolac and brominated cresol novolac. Preferable are bisphenol type epoxy resins such as a bisphenol A-type epoxy resin and a bisphenol F-type epoxy resin, N,N-diglycidyl-o-toluidine, N,N-diglycidylaniline, 3,4-epoxycyclohexylmethyl-3,4-epoxycyclohexane carboxylate and hexahydrophthalic anhydride diglycidyl ester. A bisphenol A-type epoxy resin and/or a bisphenol F-type epoxy resin is more preferable. These epoxy resins may be used either singly or in combination.

The novolac resin (b) in the present invention is used as a curing agent. Examples of the novolac resin (b) include novolac resins obtained by using as starting materials phenols such as bisphenol A, bisphenol F, bisphenol S, 4,4'-biphenylphenol, 2,2',6,6'-tetramethyl-4,4'-biphenylphenol, 2,2'-methylene-bis(4-methyl-6-tert-butylphenol), trishydroxyphenylmethane, pyrogallol and phenols containing diisopropylidene skeletons, a phenol containing a fluorene skeleton such as 1,1-di-4-hydroxyphenylfluorene, a polyphenol compound such as a phenolic polybutadiene, phenol, cresol, ethylphenol, butylphenol, octylphenol, brominated bisphenol A such as tetrabromobisphenol A, and naphthol; xylylene skeleton-containing phenolic novolac resins; dicyclopentadiene skeleton-containing phenolic novolac resins; fluorene skeleton-containing phenolic novolac resins; and phenolic novolac resins obtained by binding phenols such as phenol, cresol, ethylphenol, butylphenol, octylphenol, bisphenol A, brominated bisphenol A, bisphenol F, bisphenol S and naphthol through a crosslinking group (aralkylene group) represented by formula (1), (2) or (3)

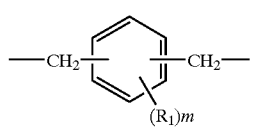

(1)

wherein $R_1$ represents a hydrogen atom, an alkyl group having from 1 to 4 carbon atoms, an allyl group or a halogen atom, and m is an integer of from 1 to 4, provided that when m is 2 or more, $R_1$'s may be the same or different,

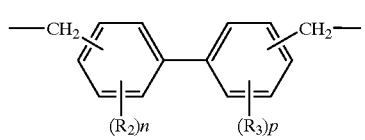

(2)

wherein $R_2$ and $R_3$, independently from each other, represent a hydrogen atom, an alkyl group having from 1 to 4 carbon atoms, an allyl group or a halogen atom, and n and p are each an integer of from 1 to 4, provided that when n or p is 2 or more, $R_2$'s or $R_3$'s may be the same or different, or

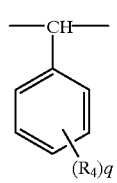

(3)

wherein $R_4$ represents a hydrogen atom, an alkyl group having from 1 to 8 carbon atoms, an allyl group, a halogen atom or a hydroxyl group, and q is an integer of from 1 to 5, provided that when q is 2 or more, $R_4$'s may be the same or different.

Preferable are novolac resins obtained by using as starting materials phenol, cresol, ethylphenol, butylphenol, octylphenol, bisphenol A, allylphenol, bisphenol F, bisphenol S and naphthol; xylylene skeleton-containing phenolic novolac resins; dicyclopentadiene skeleton-containing phenolic novolac resins; fluorene skeleton-containing phenolic novolac resins; and phenolic novolac resins obtained by binding phenols such as phenol, cresol, ethylphenol, butylphenol, octylphenol, bisphenol A, brominated bisphenol A, bisphenol F, bisphenol S and naphthol through a crosslinking group (aralkylene group) represented by formula (4), (5) or (6)

(4)

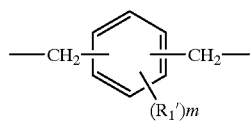

wherein $R_1$ represents a hydrogen atom or an alkyl group having from 1 to 4 carbon atoms, and m is an integer of from 1 to 4, provided that when m is 2 or more, $R_1$'s may be the same or different, (5)

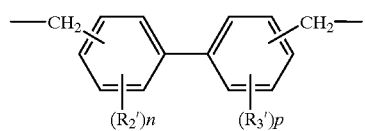

wherein $R_2'$, and $R_3'$, independently from each other, represent a hydrogen atom, an alkyl group having from 1 to 4 carbon atoms, and n and p are each an integer of from 1 to 4, provided that when n or p is 2 or more, $R_2$'s or $R_3$'s may be the same or different, or (6)

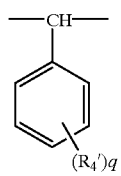

wherein $R_4$, represents a hydrogen atom, an alkyl group having from 1 to 8 carbon atoms or a hydroxyl group, and q is an integer of from 1 to 5, provided that when q is 2 or more, $R_4$'s may be the same or different.

More preferable are novolac resins obtained by using as starting materials phenols such as phenol, cresol, octylphenol, bisphenol A, bisphenol F, bisphenol S and naphthol; and phenolic novolac resins obtained by binding phenols such as phenol, cresol, octylphenol, bisphenol A, bisphenol F, bisphenol S and naphthol through the crosslinking group (aralkylene group) of the above-mentioned formula (4), (5) or (6).

Especially preferable are novolac resins obtained by using monophenols as starting materials, which are typified by a phenolic novolac resin obtained by using phenol as a starting material and a cresol novolac resin obtained by using cresol as a starting material; phenolic novolac resins obtained by binding phenols such as phenol, cresol and bisphenol A through a crosslinking group (aralkylene group) represented by formula (7), (8), (9), (10) or (11)

(7)

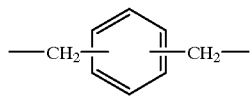

(8)

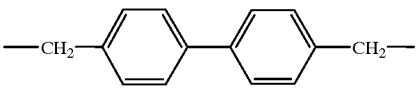

(9)

(10)

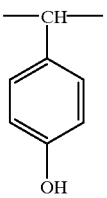

(11)

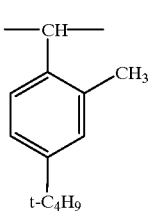

These novolac resins are used either singly or in combination. With respect to the amount of the novolac resin used in the present invention, the amount of the hydroxyl group in the novolac resin is between 0.6 and 1.4 chemical equivalents, preferably between 0.8 and 1.2 chemical equivalents, more preferably between 0.9 and 1.1 chemical equivalents based on the epoxy equivalent of the epoxy resin in the sealant.

The preferable novolac resin used in the present invention is a novolac resin obtained by using a monophenol as a starting material, as represented by formula (I)

(I)

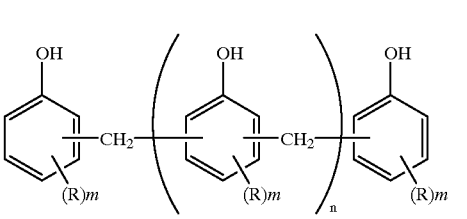

wherein R represents a hydrogen atom, a lower alkyl group, a lower alkoxy group or a halogen atom, m is an integer of from 1 to 3, provided that when m is 2 or 3, R's may be the same or different, and n is 0 or a positive integer.

In the above-mentioned formula, examples of the lower alkyl group include lower alkyl groups having from 1 to 8 carbon atoms, such as methyl, ethyl, n-propyl, isopropyl, n-butyl, isobutyl and tert-butyl. Preferable are lower alkyl groups having from 1 to 4 carbon atoms. Examples of the lower alkoxy group include lower alkoxy groups having from 1 to 8 carbon atoms, such as methoxy, ethoxy, n-propoxy, isopropoxy, n-butoxy, isobutoxy and tert-butoxy. Preferable are lower alkoxy groups having from 1 to 4 carton atoms. Examples of the halogen atom include bromine, chlorine and fluorine. The positive integer of n is preferably between 1 and 15, more preferably between 1 and 10.

Examples of the curing accelerator (c) used in the present invention include imidazoles; salts of imidazoles and polybasic carboxylic acids such as phthalic acid, isophthalic acid, terephthalic acid, trimellitic acid, pyromellitic acid, naphthalenedicarboxylic acid, maleic acid and oxalic acid; amides such as dicyanediamide; salts of the amides and phenols, the polybasic carboxylic acids or phosphinic acids; diaza compounds such as 1,8-diazabicyclo(5.4.0)undecene-7; salts of the diaza compounds and the phenols, the polybasic carboxylic acids or the phosphinic acids; phosphines such as triphenylphosphine and tetraphenylphosphonium tetraphenylborate; phenols such as 2,4,6-trisaminomethylphenol; and amine aducts.

Examples of the imidazoles include 2-methylimidazole, 2-phenylimidazole, 2-undecylimidazole, 2-heptadecylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-phenylimidazole, 1-cyanoethyl-2-undecylimidazole, 2,4-diamino-6-(2'-methylimidazolyl-(1'))-ethyl-s-triazine, 2,4-diamino-6-(2'-undecylimidazolyl-(1'))-ethyl-s-triazine, 2,4-diamino-6-(2'-ethyl-4'-methylimidazolyl-(1'))-ethyl-s-triazine; 2,4-diamino-6-(2'-methylimidazolyl-(1'))-ethyl-s-triazine•isocyanuric acid adduct, 2-methylimidazole isocyanuric acid 2:3 adduct, 2-phenylimidazole isocyanuric acid adduct, 2-phenyl-3,5-dihydroxymethylimidazole, 2-phenyl-4-hydroxymethyl-5-methylimidazole and 1-cyanoethyl-2-phenyl-3,5-bis(cyanoethoxymethyl) imidazole.

Preferable among these curing accelerators are 2,4-diamino-6-(2'-methylimidazolyl-(1')))-ethyl-s-triazine•isocyanuric acid adduct, 2-methylimidazole isocyanuric acid 2:3 adduct, 2-phenylimidazole isocyanuric acid adduct, salts of imidazoles and polybasic carboxylic acids such as phthalic acid, isophthalic acid, terephthalic acid, trimellitic acid, pyromellitic acid, naphthalenedicarboxylic acid, maleic acid and oxalic acid, and amine adducts. The amount of the curing accelerator is between 0.5 and 20 parts by weight, preferably between 1 and 15 parts by weight, more preferably between 2 and 10 parts by weight per 100 parts by weight of the epoxy resin.

In view of the improvement of workability(extension of potlife time), it is preferable to use the curing accelerator in the form of a latent curing accelerator. The latent curing accelerator is solid at room temperature. When the latent curing accelerator is dissolved through heating, it acts as a curing accelerator for the first time. Examples of the latent curing accelerator include a microcapsulated latent curing accelerator in which the above-mentioned curing accelerator is microcapsulated, a solid dispersion-type curing accelerator (for example, imidazoles) which is hardly dissolved in a solvent or an epoxy resin, and an amine adduct.

The titanium-type black pigment (d) used in the present invention refers to lower titanium oxide and nitrogen doped titanium oxide. Examples of the lower titanium oxide include a black compound represented by the formula $Ti_nO_{2n-1}$ (in which n is a positive integer), which is obtained by heating titanium dioxide and a metallic titanium powder in vacuo or in a reductive atmosphere at a temperature of from 550 to 1,100° C. as described in Japanese Patent Laid-Open No. 5,432/1974 (Japanese Patent Publication No. 12,733/1977), and a compound obtained by heating hydrous titanium dioxide and a metallic titanium powder in an inert atmosphere in the presence of a burning aid composed of a compound containing silicon, aluminum, niobium and tungsten as described in Japanese Patent Laid-Open No. 11,572/1989. Further, examples of the nitrogen doped titanium oxide include a black compound obtained by reducing a powder of titanium dioxide or titanium hydroxide in the presence of ammonia at a temperature of from about 550 to 950° C. as described in Japanese Patent Laid-Open Nos. 65,069/1985 (Japanese Patent Publication No. 51,645/1991) and 200,827/1985 (Japanese Patent Publication No. 42,773/1990), and a black compound obtained by adhering vanadium to titanium dioxide or the like and reducing the resulting substance in the presence of ammonia at from 750 to 875° C. as described in Japanese Patent Laid-Open No. 201610/1986 (Japanese Patent Publication No. 29010/1991). The volume resistivity of these titanium-type black pigments is preferably $10^{+2}\Omega\cdot$ cm or higher, more preferably $10^{+3}\Omega\cdot$ cm or higher, further preferably $10^{+4}\Omega\cdot$ cm or higher. In order that the titanium-type black pigment used in the black sealant for liquid crystal cell of the present invention imparts a high insulation property, provides a high light-shielding property and makes easy the gap formation in bonding glass substrates at the time of producing a liquid crystal cell, the average particle diameter of primary particles is 4 $\mu$m or less, preferably 2 $\mu$m or less, more preferably 1 $\mu$m or less. When the average particle diameter of the primary particles exceeds 4 $\mu$m, the insulation property of the sealant for liquid crystal cell is impaired, or the gap formation cannot be conducted satisfactorily in bonding glass substrates at the time of producing the liquid crystal cell. The amount of the titanium-type black pigment (d) is between 10 and 70% by weight, preferably between 20 and 60% by weight, more preferably between 30 and 55% by weight, further preferably between 35 and 55% by weight based on the total amount of the epoxy resin (a), the novolac resin (b), the curing accelerator (c) and the titanium-type black pigment (d).

In the present invention, an organic pigment and an inorganic pigment can be used as required to improve optical properties. Examples of the organic pigment include anthraquinone-type, phthalocyanine-type, benzoimidazolone-type, quinacridone-type, azo-chelate-type, azo-type, isoindolinone-type, pyranthrone-type, indanthrone-type, anthrapyrimidine-type, dibromoanthanthrone-type, flavanthrone-type, perylene-type, perynone-type, quinophthalone-type, thioindigo-type and dioxazine-type pigments. The details are described in Color Material Engineering Handbook compiled by Shikizai Kyokai, "Organic Pigments". However, the organic pigment is not limited thereto. These organic pigments can be used either singly or in combination.

Examples of the inorganic pigment which can be used in the present invention include metal oxides, metal sulfides, metal sulfates, metal hydroxides and metal carbonates, such as barium sulfate, zinc oxide, lead sulfate, titanium oxide, yellow lead oxide, red iron oxide, ultramarine, Prussian blue, chromium oxide, antimony white, iron black, red lead oxide, zinc sulfide, cadmium yellow, cadmium red, zinc, manganese violet, cobalt violet, barium sulfate and magnesium carbonate. Further, known carbon-type inorganic pigments such as carbon black and grafted carbon black can be used unless a resistivity is impaired. The details are described in Color Material Engineering Handbook compiled by Shikizai Kyokai, "Inorganic Pigments". However, the inorganic pigment is not limited thereto. These inorganic pigments can be used either singly or in combination.

A coupling agent can be added to the sealant for liquid crystal cell of the present invention as required. As the coupling agent, commercial products can be used, and a silane coupling agent is preferable. The amount of the coupling agent is between 0.001 and 10% by weight, preferably between 0.01 and 5% by weight based on the solid content of the sealant for liquid crystal cell.

The total amount of the titanium-type black pigment, the organic pigment and the inorganic pigment used in the present invention is between 10 and 70% by weight, preferably between 20 and 60% by weight, more preferably between 30 and 50% by weight based on the solid content (except the organic solvent) of the black sealant for liquid crystal cell. The amount of the organic pigment and/or the inorganic pigment is between 0 and 60% by weight, preferably between 0 and 50% by weight based on the total amount of the pigments. When the total amount of the pigments is 10% by weight or more, a better light-shielding property is provided. When it is 70% by weight or less, the gap formation of the liquid crystal cell is easily conducted.

In order to increase an insulation property, an adhesion strength and a humidity resistance, a filler may be added to the sealant for liquid crystal cell of the present invention. Examples of the filler include molten silica, crystalline silica, silicon carbide, silicon nitride, boron nitride, calcium carbonate, magnesium carbonate, barium sulfate, calcium sulfate, mica, talc, clay, alumina, magnesium oxide, zirconium oxide, aluminum hydroxide, magnesium hydroxide, calcium silicate, aluminum silicate, lithium aluminum silicate, zirconium silicate, barium titanate, glass fibers, carbon fibers, molybdenum disulfide and asbestos. Preferable are molten silica, crystalline silica, silicon nitride, boron nitride, calcium carbonate, barium sulfate, calcium sulfate, mica, talc, clay, alumina, aluminum hydroxide, calcium silicate and aluminum silicate. More preferable are molten silica, crystalline silica and alumina. These fillers may be used either singly or in combination. A combination of silica and alumina is especially preferable. The filler is preferably used in an amount which does not decrease the workability and a light-shielding property, for example, in the amount of 20% by weight or less based on the solid content of the organic solvent of the black sealant for liquid crystal cell. The average particle diameter of this filler is 4 $\mu$m or less, preferably 2 $\mu$m or less, more preferably 1 $\mu$m or less. When the average particle diameter is 4 $\mu$m or less, the gap formation can be conducted satisfactorily in bonding glass substrates at the time of producing the liquid crystal cell.

In order to improve a workability and decrease a viscosity, a solvent may be added to the sealant for liquid crystal cell of the present invention. The solvent includes an alcohol solvent, an ether solvent and an acetate solvent. These can be used either singly or in combination at an optional ratio.

Examples of the alcohol solvent include alkyl alcohols such as ethanol and isopropyl alcohol; and alkoxy alcohols such as 3-methyl-3-methoxybutanol, 3-methyl-3-ethoxybutanol, 3-methyl-3-n-propoxybutanol, 3-methyl-3-isopropoxybutanol, 3-methyl-3-n-butoxybutanol, 3-methyl-3-isobutoxybutanol, 3-methyl-3-sec-butoxybutanol and 3-methyl-3-tert-butoxybutanol.

The ether solvent includes a monohydric alcohol ether solvent, an alkylene glycol monoalkyl ether solvent, an alkylene glycol dialkyl ether solvent, a dialkylene glycol alkyl ether solvent and a trialkylene glycol alkyl ether solvent.

Examples of the monohydric alcohol ether solvent include 3-methyl-3-methoxybutanol-methyl ether, 3-methyl-3-ethoxybutanol-ethyl ether, 3-methyl-3-n-butoxybutanol-ethyl ether, 3-methyl-3-isobutoxybutanol-propyl ether, 3-methyl-3-sec-butoxybutanol-isopropyl ether and 3-methyl-3-tert-butoxybutanol-n-butyl ether.

Examples of the alkylene glycol monoalkyl ether solvent include propylene glycol monomethyl ether, propylene glycol monoethyl ether, propylene glycol monopropyl ether, propylene glycol monoisopropyl ether, propylene glycol mono-n-butyl ether, propylene glycol monoisobutyl ether, propylene glycol mono-sec-butyl ether, propylene glycol mono-tert-butyl ether, ethylene glycol monomethyl ether, ethylene glycol monoethyl ether, ethylene glycol monopropyl ether, ethylene glycol monoisopropyl ether, ethylene glycol mono-n-butyl ether, ethylene glycol monoisobutyl ether, ethylene glycol mono -sec-butyl ether and ethylene glycol mono-tert-butyl ether.

Examples of the alkylene glycol dialkyl ether solvent include propylene glycol dimethyl ether, propylene glycol diethyl ether, propylene glycol dipropyl ether, propylene glycol diisopropyl ether, propylene glycol di-n-butyl ether, propylene glycol diisobutyl ether, propylene glycol di-sec-butyl ether, propylene glycol di-tert-butyl ether, ethylene glycol dimethyl ether, ethylene glycol diethyl ether, ethylene glycol dipropyl ether, ethylene glycol diisopropyl ether, ethylene. glycol di-n-butyl ether, ethylene glycol diisobutyl ether, ethylene glycol di-sec-butyl ether and ethylene glycol di-tert-butyl ether.

Examples of the dialkylene glycol alkyl ether solvent include dipropylene glycol methyl ether, dipropylene glycol ethyl ether, dipropylene glycol dipropyl ether, dipropylene glycol diisopropyl ether, dipropylene glycol di-n-butyl ether, dipropylene glycol diisobutyl ether, dipropylene glycol di-sec-butyl ether, dipropylene glycol di-tert-butyl ether, diethylene glycol dimethyl ether (diglyme), diethylene glycol diethyl ether, diethylene glycol dipropyl ether, diethylene glycol diisopropyl ether, diethylene glycol di-n-butyl ether, diethylene glycol diisobutyl ether, diethylene glycol di-sec-butyl ether and diethylene glycol di-tert-butyl ether.

Examples of the trialkylene glycol alkyl ether solvent include tripropylene glycol dimethyl ether, tripropylene glycol diethyl ether, tridipropylene glycol dipropyl ether, tripropylene glycol diisopropyl ether, tripropylene glycol di-n-butyl ether, tripropylene glycol diisobutyl ether, tripropylene glycol di-sec-butyl ether, tripropylene glycol di-tert-butyl ether, triethylene glycol dimethyl ether, triethylene glycol diethyl ether, triethylene glycol dipropyl ether, triethylene glycol disopropyl ether, triethylene glycol di-n-butyl ether, triethylene glycol diisobutyl ether, triethylene glycol di-sec-butyl ether and triethylene glycol di-tert-butyl ether.

Examples of the acetate solvent include an alkyleneglycolmonoalkylether acetate, for example, ethylene glycol monomethyl ether acetate, ethylene glycol monoethyl ether acetate, ethylene glycol monopropyl ether acetate, ethylene glycol monoisopropyl ether acetate, ethylene glycol mono-n-butyl ether acetate, ethylene glycol mono-sec-butyl ether acetate, ethylene glycol mono-isobutyl ether acetate, ethylene glycol mono-tert-butyl ether acetate, propylene glycol monomethyl ether acetate, propylene glycol monoethyl ether acetate, propylene glycol monoisopropyl ether acetate, propylene glycol monopropyl ether acetate, propylene glycol mon-n-butyl ether acetate, propylene glycol mono-sec-butyl ether acetate, propylene glycol monoisobutyl ether acetate, propylene glycol mono-tert-butyl ether acetate, 3-methyl-3-methoxybutyl acetate, 3-methyl-3-ethoxybutyl acetate, 3-methyl-3-propoxybutyl acetate, 3-methyl-3-isopropoxybutyl acetate, 3-methyl-3-n-butoxyethyl acetate, 3-methyl-3-isobutoxybutyl acetate, 3-methyl-3-sec-butoxybutyl acetate and 3-methyl-3-tert-butoxybutyl acetate; an alkylene glycol diacetate such as ethylene glycol diacetate, diethylene glycol diacetate, triethylene glycol diacetate, propylene glycol diacetate, dipropylene glycol diacetate and tripropylene glycol diacetate; and butyl acetate.

The solvent can be used in an amount required to adjust the viscosity to, for example, from 200 to 400 poises (25° C.) at which the black sealant for liquid crystal cell can be coated with a dispenser or through screen printing. It is ordinarily used such that nonvolatile components in the black sealant for liquid crystal cell is 50% by weight or more, preferably between 70 and 95% by weight.

The black sealant for liquid crystal cell of the present invention can be produced by heat-mixing the epoxy resin, the novolac resin and as required, the solvent with stirring to dissolve the same, further adding thereto the titanium-type black pigment, the curing accelerator and as required, the organic pigment and/or the inorganic pigment, the filler, the coupling agent, the defoamer and the leveling agent in predetermined amounts, and mixing them using a known mixer such as a ball mill, a sand mill or a triple roll mill. Incidentally, the curing accelerator, the coupling agent, the defoamer and the leveling agent may be used after being added to a resin solution which is mixed with the pigment using a mixer.

With respect to the black sealant for liquid crystal cell of the present invention, the volume resistivity of its cured film is preferably $10^7 \Omega \cdot$ cm or more under measurement conditions that a film thickness is 7 $\mu$m and a voltage is 30 V or less. Further, the optical density (OD) of the cured film is 2.0 or more, more preferably 2.5 or more, further preferably 3.0 or more with the film thickness of 7 $\mu$m or less.

The black sealant for liquid crystal cell of the present invention also includes one comprising the epoxy resin (a), the novolac resin (b), the curing accelerator (c), the titanium-type black pigment (d) and further the spacer (e). The spacer is ordinarily used by being incorporated into a spacer-free sealant immediately before use as will be later described. It may be incorporated in advance together with the components (a) to (d) as required. Examples of the spacer include glass fibers and glass beads. The diameter of the spacer varies depending on the purpose. It is usually between 2 and 10 $\mu$m, preferably between 4 and 7 $\mu$m. The amount of the spacer is between 0.05 and 4 parts by weight, preferably between 0.3 and 3 parts by weight, more preferably between 0.5 and 1.5 parts by weight per 100 parts by weight of the black sealant for liquid crystal cell of the present invention except the solvent.

Considering the volume resistivity of the cured film, the particle diameter of the titanium-type black pigment (d) is preferably less than the diameter of the spacer, more preferably not more than half the diameter of the spacer, further preferably not more than 1/3 the diameter of the spacer, especially preferably not more than 1/4 the diameter of the spacer.

Further, in order not to impair the durability of the liquid crystal cell through contamination of the liquid crystal material and/or through corrosion of the liquid crystal cell due to ions in the sealant, it is advisable that the amounts of the ionic components in the black sealant for liquid crystal cell of the present invention are small. Examples of the ionic components include alkali metal ions such as a sodium ion and a potassium ion; alkaline earth metal ions such as a calcium ion; halogen ions such as a chlorine ion; and a sulfuric acid ion. The total amount of these ions is, for example, 1,000 ppm or less, more preferably 700 ppm or less.

In the liquid crystal cell of the present invention, a pair of opposite substrates in which predetermined electrodes are formed on glass substrates are arranged with a predetermined gap, the surroundings are sealed with the sealant for liquid crystal cell of the present invention, and the liquid crystal material is charged into the gap. It is produced by, for example, adding a spacer (gap controlling material) such as glass fibers or the like to the sealant for liquid crystal cell of the present invention, coating the sealant for liquid crystal cell on the peripheral end of one of the pair of substrates except the liquid crystal injection port using a dispenser, then evaporating the solvent through heating, for example, at 100° C. for 10 minutes, thereafter binding the upper and lower glass substrates, pressing the substrates to form a gap, curing the resulting substrates at from 160 to 180° C. for from 1 to 2 hours, injecting the liquid crystal into the gap between the pair of substrates, and then sealing the liquid crystal injection port. The binding and the pressing of the upper and lower glass substrates may be conducted while heating the substrates. The thus-obtained liquid crystal cell of the present invention is excellent in an adhesion, a humidity resistance and a heat resistance.

Further, the cured film of the present invention obtained by using the epoxy resin (a), the novolac resin (b), the curing accelerator (c) and the titanium-type black pigment (d) as essential components and having the volume resistivity of $10^7 \Omega \cdot$ cm or more can usually be formed from the composition used as the sealant of the present invention. The optical density (OD) of the resulting cured film is preferably 2.0 or more, more preferably 2.5 or more, further preferably 3.0 or more with the film thickness of 7 $\mu$m or less. Both of the liquid crystal cell having this cured film and the liquid crystal display device obtained by using this liquid crystal cell have the above-mentioned characteristics of the present invention. In addition, this cured film may be used in applications other than the sealing film of the liquid crystal cell.

The use of the black sealant for liquid crystal cell of the present invention can provide the liquid crystal cell which prevents light leakage of the liquid crystal sell from the crystal sealed portion, which has a high electrical insulation property and which is excellent in an adhesion strength and a humidity resistance.

EXAMPLES

The present invention is illustrated more specifically by referring to the following Examples.

Example 1

One hundred grams of a bisphenol A-type epoxy resin (Trade Name: Epikote 1001, manufactured by Yuka Shell K.K.) having an epoxy equivalent of 480 and a phenolic novolac resin (Trade Name: Tamanoru 758, manufactured by Arakawa Kagaku Kogyo K.K.) were heat-dissolved as epoxy resins into 58 g of propylene glycol monoethyl ether acetate as a solvent. Eighty grams of a titanium-type black pigment (Trade Name : titanium black. 13 R, manufactured by Mitsubishi Material K.K.) were satisfactorily mixed with and dispersed in this resin solution using a sand mill such that the particle diameter of the titanium-type black pigment became 1 $\mu$m or less. To this dispersion were added 1.3 g of 2-ethyl-4-methylimidazole (Trade Name : 2E4MZ, manufactured by Shikoku Kasei K.K.) as a curing accelerator and 9 g of N-phenyl-γ-aminopropyltrimethoxysilane as a coupling agent to obtain a black sealant for liquid crystal cell of the present invention.

Experiment Example 1

Test for Optical Characteristics

One gram of glass fibers having a diameter of 7 $\mu$m was added as a spacer to 100 g of the resulting black sealant for liquid crystal cell, and these were mixed and stirred. This black sealant for liquid crystal cell was coated on a glass substrate having a size of 50 mm×50 mm using a dispenser, and the solvent was volatilized through heating with a hot plate. Subsequently, a glass substrate of the same size was overlaid on the above-mentioned substrate on a hot plate of 140° C. A load was exerted thereon, and the black sealant for liquid crystal cell was pressed to the diameter of 7 μm of the glass fibers as a spacer. The glass substrate having pressed thereon the black sealant for liquid crystal cell was held with a clip, and cured in an oven of 100° C. for 1 hour and then in an oven of 150° C. for 1 hour to obtain a measurement sample of the cured film of the black sealant for liquid crystal cell. Then, this glass substrate was set at a spectrometer, and a value Y of a transmitted light was measured at a wavelength of from 380 to 780 nm in an XYZ color system based on a 2° visual field using a standard light C according to JIS Z8722. Consequently, it was found to be 0.2. The optical density was calculated using the following formula Optical density=log (100/Y)

and was found to be 3.7. It was identified that a light-shielding property was satisfactory.

Experiment Example 2

Test for a Volume Resistivity

One gram of glass fibers having a diameter of 7 μm was added as a spacer to 100 g of the resulting black sealant for liquid crystal cell, and these were mixed and stirred. This black sealant for liquid crystal cell was coated on a chromium-deposited surface of a chromium-deposited glass substrate having a size of 50 mm×50 mm using a dispenser, and the solvent was volatilized through heating with a hot plate. Subsequently, a chromium-deposited glass substrate of the same size was overlaid on the above-mentioned substrate by being slid such that the chromium-deposited surface was brought into contact with the black sealant for liquid crystal cell unless the black sealant for liquid crystal cell was protruded therefrom. A load was exerted thereon, and the black sealant for liquid crystal cell was pressed to the diameter of 7 μm of the glass fibers as a spacer. At this time, the procedure was conducted such that the overlaid portion of the chromium-deposited glass substrates is filled with the black sealant for liquid crystal cell in bubble-free state. The chromium-deposited glass substrate having pressed thereon the black sealant for liquid crystal cell was held with a clip, and cured in an oven of 100° C. for 1 hour and then in an oven of 150° C. for 1 hour to obtain a measurement sample of the cured film of the black sealant for liquid crystal cell. The area [(S), cm$^2$] of the black sealant for liquid crystal cell held between the opposite chromium-deposited glass substrates was measured. A constant voltage (V) was applied between the chromium-deposited surfaces of the opposite chromium-deposited glass substrates using a constant voltage generator (Trade No.: PA 36-2A regulated DC power supply, manufactured by Kenwood), and a current [(A), ampere] passing through the film was measured with an ammeter (Trade Name: R644C Digital Multimeter, manufactured by Advan Test K.K.). Next, the resistivity was calculated using the following formula. At this time, the film thickness of the black sealant for liquid crystal cell was $7 \times 10^{-4}$ cm.

Volume resistivity [Ω• cm]=(V•S)/(A•$7 \times 10^{-4}$) wherein V is a voltage, S is an area (cm$^2$) of a black sealant for liquid crystal cell held between the opposite chromium-deposited glass substrates, and A is a current (ampere) passing through the film.

As a result, the volume resistivity was as high as $10^7$Ω• cm or more with the applied voltage of 10 V also.

Experiment Example 3

Tests for a Humidity Resistance and an Adhesion Strength

One gram of glass fibers having a diameter of 7 μm was added as a spacer to 100 g of the resulting black sealant for liquid crystal cell, and these were mixed and stirred. The resulting sealant for liquid crystal cell was coated on a glass substrate having a size of 50 mm×50 mm using a dispenser. The solvent was volatilized through heating with a hot plate. A glass piece having a size of 2 mm×2 mm was bonded onto the sealant for liquid crystal cell, and cured with an oven of 100° C. for 1 hour and then with an oven of 150° C. for 1 hour. Subsequently, a pressure cooker test was conducted at 121° C., 2 atm and a humidity of 100% to measure a shear adhesion strength. The results are shown in Table 2.

Example 2

A sealant for liquid crystal cell of the present invention was prepared in the same manner as in Example 1 according to the recipe shown in column of Example 2 of Table 1, and the properties thereof were evaluated as in Experiment Examples 1 to 3. The results are shown in Table 2. As is clear from Table 2, the light-shielding property, the insulation property and the adhesion strength in Example 2 are the same as those in Example 1.

TABLE 1

|  | Example | |
| --- | --- | --- |
|  | 1 | 2 |
| Epoxy resin | | |
| A (liquid: epoxy equivalent 185) | — | 100 |
| B (solid: epoxy equivalent 480) | 100 | — |
| Curing agent | | |
| A (softening point 50° C.) | — | 54 |
| B (softening point 80° C.) | 24 | — |
| Titanium-type black pigment | | |
| Titanium black | 80 | 130 |
| Curing accelerator | | |
| Amine adduct | — | 8 |
| 2-Ethyl-4-methylimidazole | 1.3 | — |
| Solvent | 58 | 35 |
| Silane coupling agent | 9 | 15 |

Description of starting materials shown in Table 1:

Epoxy resin

Liquid epoxy resin A: Bisphenol A-type epoxy resin (Trade Name: RE-310S, manufactured by Nippon Kayaku Co., Ltd.)

Solid epoxy resin B:Bisphenol A-type epoxy resin (Trade Name: Epikote 1001, manufactured by Yuka Shell K.K.)

Curing agent

Curing agent A:

Phenolic novolac resin (Trade Name: PN-152, manufactured by Nippon Kayaku Co., Ltd., a resin containing a mixture of compounds of formula (I) in which R is H and n is 0 and 1 or more, the content of a compound with n=0 being approximately 40%)

Curing agent B:
Phenolic novolac resin (Trade Name:Tamanoru 758, manufakuturing by Arakawa Kagaku Kogyo K.K., a resin containing a mixture of compounds of formula (I) in which R is H and n is 0 and 1 or more, the content of a compound with n=0 being approximately 10%)

Titanium-type black pigment:
(Trade Name: Titanium Black 13R, manufactured by Mitsubishi Material K.K.)

Curing accelerator:
Amine adduct(Trade Name: Amicure MY-H, manufactured by Ajinomoto Co., Inc.)
2-Ethyl-4-methylimidazole (Trade Name:2E4MZ, manufactured by Shikoku Kasei K.K.)

Solvent:
Propylene glycol monoethyl ether acetate

Silane coupling:
N-phenyl-γ-aminopropyltrimethoxysilane (Trade Name: KBM-573, manufactured by The Shin-etsu Chemical Industry Co., Ltd.)

TABLE 2

|  | Example | |
| --- | --- | --- |
|  | 1 | 2 |
| Light-shielding property (OD) | 3.7 | 3.3 |
| Volume resistivity (Ω · cm) | >$10^7$ | >$10^7$ |
| Adhesion strength after test for humidity resistance | 298 | 250 |

As is clear from Table 2, the black sealant for liquid crystal cell of the present invention has an excellent light-shielding property by which to prevent light leakage of a liquid crystal cell, a high insulation property, an excellent humidity resistance and a high adhesion strength.

What is claimed is:

1. A black sealant for liquid crystal cell comprising (a) an epoxy resin, (b) a novolac resin, (c) a curing accelerator and (d) a titanium black pigment.

2. The black sealant for liquid crystal cell recited in claim 1, wherein the particle diameter of the titanium black pigment (d) is 4 μm or less.

3. The black sealant for liquid crystal cell recited in claim 2, wherein the amount of the titanium black pigment is between 10 and 70% by weight based on the solid content except the organic solvent of the black sealant for liquid crystal cell.

4. The black sealant for liquid crystal cell recited in claims 3, wherein the volume resistivity of the cured film of the black sealant for liquid crystal cell is $10^7$Ω· cm or more.

5. The black sealant for liquid crystal cell recited in claim 4, wherein the optical density (OD) of the cured film of the black sealant for liquid crystal cell is 2.0 or more with the film thickness of 7 μm or less.

6. The black sealant for liquid crystal cell recited in claim 5, which further comprises an organic pigment and/or an inorganic pigment.

7. A black sealant for liquid crystal cell comprising (a) an epoxy resin, (b) a novolac resin, (c) a curing accelerator, (d) a titanium black pigment and (e) a spacer.

8. The black sealant for liquid crystal cell recited in claim 7, wherein the diameter of the spacer (e) is between 2 and 10 μm, and the particle diameter of the titanium black pigment (d) is less than the diameter of the spacer.

9. The black sealant for liquid crystal cell recited in claim 8, wherein the particle diameter of the titanium black pigment (d) is not more than half the diameter of the spacer.

10. The black sealant for liquid crystal cell recited in claim 9, wherein the amount of the titanium-type black pigment (d) is between 10 and 70% by weight based on the total amount of the epoxy resin (a), the novolac resin (b), the curing accelerator (c) and the titanium black pigment (d).

11. The black sealant for liquid crystal cell recited in any one of claim 10, wherein the amount of the spacer (e) is between 0.05 and 4 parts by weight per 100 parts by weight in total of the epoxy resin (a), the novolac resin (b), the curing accelerator (c) and the titanium black pigment (d).

12. A liquid crystal cell which is sealed with the sealant recited in any one of claims 1 to 11.

13. A liquid crystal display device having the liquid crystal cell of claim 12.

14. A cured film obtained from components comprising, as essential components, (a) an epoxy resin, (b) a novolac resin, (c) a curing accelerator and (d) a titanium black pigment, and having a volume resistivity of $10^7$Ω· cm or more.

* * * * *